United States Patent [19]
Fowell et al.

[11] Patent Number: 5,884,869
[45] Date of Patent: Mar. 23, 1999

[54] SATELLITE SPIN VECTOR CONTROL WITH SUN SENSOR

[75] Inventors: Richard A. Fowell; Thomas M. Tanner, both of Culver City, Calif.

[73] Assignee: Hughes Electronics Corporation, Los Angeles, Calif.

[21] Appl. No.: 617,230

[22] Filed: Mar. 18, 1996

[51] Int. Cl.$^6$ .............................. B64G 1/26; B64G 1/36; B64G 1/38

[52] U.S. Cl. .......................... 244/169; 244/170; 244/171; 701/13

[58] Field of Search .................................. 244/164, 168, 244/169, 170, 171; 701/13

[56] References Cited

U.S. PATENT DOCUMENTS

| | | | |
|---|---|---|---|
| 3,294,344 | 12/1966 | Rosen et al. | 244/169 |
| 3,758,051 | 9/1973 | Williams | 244/170 |
| 4,161,780 | 7/1979 | Rudolph et al. | 701/13 |
| 4,370,716 | 1/1983 | Amieux | 701/13 |
| 4,758,957 | 7/1988 | Hubert et al. | 244/169 X |
| 4,837,699 | 6/1989 | Smay et al. | 701/13 |
| 5,452,869 | 9/1995 | Basuthakur et al. | 244/164 |

FOREIGN PATENT DOCUMENTS

| | | |
|---|---|---|
| 581292 | 2/1994 | European Pat. Off. . |
| 2040513 | 8/1980 | United Kingdom . |
| WO 87/00653 | 1/1987 | WIPO . |

OTHER PUBLICATIONS

Wertz, James R., "Spacecraft Attitude Determination and Control," D. Reideal Publishing, 1978, Sections 7.1.1 and 16.3.2 and Figs. 22.2 and 22.3.

Taylor, Javin M. et al., "Use of Precession Modulation for Nutation Control Spin–Stablized Spacecraft," J. Spacecraft, vol. 12, No. 5, May 1975, pp. 259–260.

Smay, John W., "Attitude Control for the Westar/Palapa Recovery Mission," SAE Aerospace Control and Guidance Committee, Mar. 1985.

Cope, Paul, "Guidance and Control of Meteosat, Second Generation," ESA GNC Conference, Apr. 1994.

MacLellan, D. C. et al, "Lincoln Experimental Satellites 5 amd 6," AIAA 3rd Communications Satellite Systems Conference, Los Angeles, CA, Apr. 6–8, 1970.

*Primary Examiner*—William Grant
*Attorney, Agent, or Firm*—Terje Gudmestad; Georgann S. Grunebach; Michael W. Sales

[57] ABSTRACT

A method for simultaneously controlling satellite nutation, sun angle and attitude walk using a dual-slit sun sensor and thrusters. The sun angle and nutation angles are computed from sun sensor data, and the thrusters are fired when their use improves both sun angle and nutation. Precession around the sun line is controlled by constraining firing, in the simplest case, firing only when the angular momentum is precessed directly toward or away from the sun. Precession maneuvers are implemented by commanding a new sun angle and precession plane spin phase.

7 Claims, 3 Drawing Sheets

SATELLITE SPIN VECTOR CONTROL WITH SUN SENSOR

TECHNICAL FIELD

This invention relates generally to sensing and controlling space vehicle nutation and precession and specifically to autonomously using sensed sun data to simultaneously control nutation and precession.

BACKGROUND ART

Ejections of satellites at low spin speed are currently problematic because transverse spring ejection torque impulse creates a precession error inversely proportional to the spacecraft spin speed. The firing of thrusters to correct nutation adds to the problem. The present invention permits the reduction of allowable spin speed at separation by enabling an autonomous correction of the sun angle postejection, then maintaining this sun angle and nearly eliminating attitude walk in the transverse direction.

U.S. Pat. No. 4,370,716, to Amieux, discloses an active nutation control system for a space vehicle. The system disclosed controls nutation with thrusters and maintains attitude by bookkeeping the transverse angular impulse and restricting firings to those that correct both nutation and precession. The use of a sun sensor as the nutation sensor is mentioned in passing in column 7, line 64, but direct precession measurement is not suggested.

While the prior techniques function with a certain degree of efficiency, none discloses the advantages of the satellite spin vector control with sun sensor of the present invention as is hereinafter more fully described.

DISCLOSURE OF THE INVENTION

An object of the present invention is to provide a satellite control that uses data from a dual-slit sun sensor to control thrusters to selectively and simultaneously reduce nutation, sun elevation angle and attitude walk.

Another object is to provide a satellite control that controls the rate of satellite spin.

A feature of the satellite control of the present invention is the capability of acquiring a precommanded sun elevation angle after launch vehicle separation.

An advantage of the present invention is that it provides a satellite control capable of controlling precession and nutation simultaneously.

Another advantage is that it is capable of performing at low satellite spin speeds.

Yet another advantage is that sun sensors are usually already included on most spacecraft.

Still another advantage is that, unlike gyros, which are also suitable in low satellite spin speed nutation control applications, sun sensors demand little power.

Another advantage is that the life expectancy of sun sensors, compared, for example, to that of gyros, is not a major concern.

In realizing the aforementioned and other objects, a method is provided for simultaneously controlling satellite precession and nutation. The satellite is spinning about a spin axis and nutating about an angular momentum vector. The satellite has a dual-slit sun sensor including a straight slit sensor and a canted slit sensor and includes at least one thruster, the thruster having a precession torque of known spin phase with respect to at least one reference, typically, the sun, that is stationary relative to the satellite.

Solar times of arrival are sensed at the straight slit sensor and then at the canted slit sensor. Satellite spin phase is then computed from the times of arrival at the straight slit. The elapsed time between solar times of arrival at the straight and canted slit sensors is determined and used to compute instantaneous sun elevation, and a sun elevation signal representative thereof is generated.

The sun elevation signal is filtered to determine satellite precession and nutation. Upper and lower reference amplitudes of nutation angle are established, the upper amplitude being greater than the lower amplitude.

The thruster is fired to reduce nutation if the nutation angle is greater than the upper reference amplitude of nutation angle. If the nutation angle is between the upper and lower reference amplitudes, the thruster is fired to reduce nutation, but if and only if it also reduces precession. The thruster is fired to improve precession if the nutation angle is below the lower reference amplitude and if precession is out of tolerance.

If the satellite is to be reoriented, a new value for precession is commanded preceding the step of sensing solar times of arrival at the straight slit sensor. The computer can also determine satellite spin rate from sun sensor data and selectively fire spin thrusters to control the spin rate.

The objects and advantages of the present invention are readily apparent from the following detailed description of the best mode for carrying out the invention when taken in connection with accompanying drawing.

BRIEF DESCRIPTION OF THE DRAWING

A more complete appreciation of the invention and many of the attendant advantages thereof may be readily obtained by reference to the following detailed description when considered with the accompanying drawing in which like reference characters indicate corresponding parts in all the views, wherein.

BEST MODE FOR CARRYING OUT THE INVENTION

Although the sensing of nutation and sun precession angle from sun sensor data is not new, standard sun sensors cannot measure rotation (solar yaw) about a line to the sun. To prevent such rotation, we restrict thruster firings so that angular momentum is always precessed in the same plane.

This is done by timing the firings from the sun pulse. In the simplest case, this plane includes the sun; and all precession is directly toward or away from the sun.

Figure 1A:
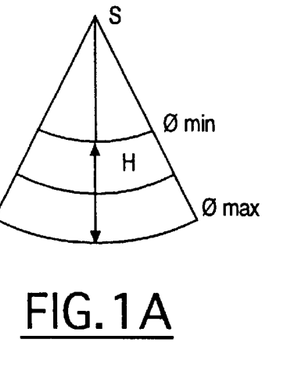
FIGS. 1A through 1C of the drawing illustrate the angle of rotation of the precession plane.
Figure 1B:
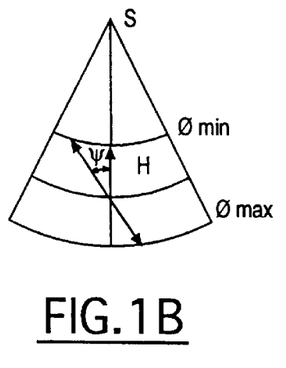
Figure 1C:
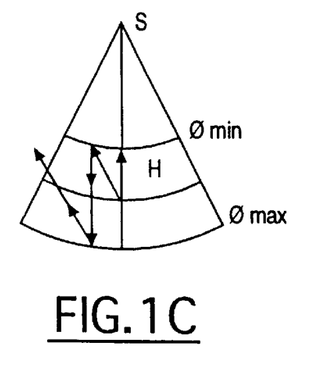

In a more general case, the precession plane is rotated by a fixed angle $\psi$ (other than 90°) from that plane. As shown by FIG. 1 of the drawing, the motion (solar yaw) of the angular momentum vector H around the sun line S is limited by limiting the sun precession angle between the angular momentum vector H and the sun line S to be within a range between, for example, $\phi_{min}$ and $\phi_{max}$ and by the constraint that H must move in a single plane. In FIG. 1A, $\psi=0$. In FIG. 1B, $\psi \neq 0$. FIG. 1C illustrates nonplanar precession.

Many errors, including, for example, sensor/thruster misalignment and sensor/actuator delay, simply change the effective value of $\psi$ (FIG. 1B). They do not, however, build up sun azimuth over time. The errors of gravest concern are those that cause nonplanar precession, (FIG. 1C). These include differential thruster misalignment when using two thrusters or bias in estimating spin speed when using a single thruster with 0° or 180° spin delay. These problems can be minimized by careful implementation.

This idealized case, in which no time delays are needed, communicates the essence of the invention. The basic example will then be expanded to consider more general problems and to illustrate how the complexities of actual sensors, actuators and dynamics are handled.

The basic example includes: (a) a rigid satellite spinning, with angular momentum vector H and principal spin axis P, (b) an ideal sensor that reports both sun precession angle $\phi$ and nutation angle $\nu$ once per revolution, and (c) a pair of thrusters that each produce an instantaneous torque impulse when fired.

Figure 2A:
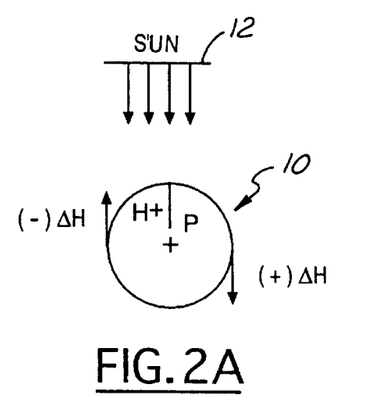
FIG. 2A of the drawing includes a top view of a satellite.
Figure 2B:
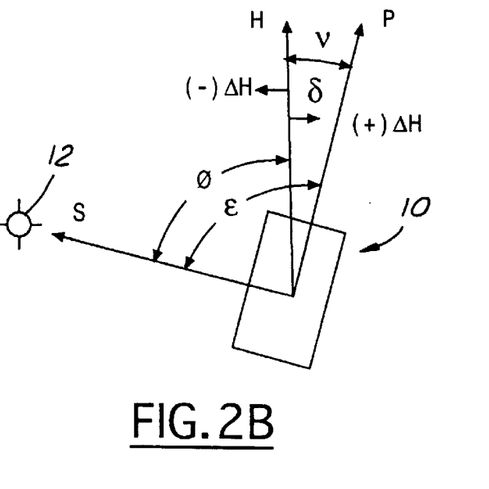
FIG. 2B is a side view of the satellite illustrated by FIG. 2A and showing relative directional relationships of its angular momentum vector and its principal spin axis relative to its sun line.

The basic example of a satellite, generally indicated by reference numeral 10, is illustrated by FIGS. 2A and 2B of the drawing. These figures are respective top and side views of the satellite 10. The relative direction of the sun 12 is indicated by vector S (FIG. 2B only) extending from the center of mass of the satellite toward the sun 12.

The satellite 10 is rigid and normally spins about a principal spin axis represented by vector P. Its angular momentum vector is represented by vector H, and both vectors P and H extend from the center of mass of the satellite 10. FIG. 2A illustrates the points on the top of the satellite 10 through which the principal spin axis vector P and the angular momentum vector H pass.

FIGS. 2A and 2B also include vectors $(-)\Delta R$ and $(+)\Delta H$, each of which represents the angular momentum increment resulting from the firing of a thruster (not shown). If, when a thruster is fired, the nutation angle $\nu$ is much smaller than the sun precession angle $\phi$, the latter angle $\phi$ is directly reduced, and the precession of the angular momentum vector H in an orthogonal direction is negligible. The direction change of the angular momentum vector H is thruster increment $\delta$ (FIG. 2B), where $\delta = \arctan(\Delta H/H)$.

FIG. 2B illustrates a representative angular relationship between the various vectors. The angle between the satellite angular momentum vector H and the satellite principal spin axis P is the nutation angle $\nu$, nutation being the "coning" of the satellite principal spin axis vector P about the satellite angular momentum vector H. The angle between the satellite angular momentum vector H and the vector S extending toward the sun 12 is the sun precession angle $\phi$. The angle between the satellite principal spin axis P and the vector S extending toward the sun 12 is the sun elevation angle $\epsilon$. When the satellite angular rate is along its principal spin axis P, the satellite angular momentum vector H is along the principal spin axis P.

In the absence of external torques, the angular momentum vector H remains fixed, and the vector S, nearly so, in inertial space. The orbit of an earth-orbiting satellite has a small oscillation at the satellite's orbit rate, and the earth's orbit around the sun produces a slow motion at the earth's orbit rate. In most instances, nutation is the motion of primary concern.

Assuming for a moment that the sun precession angle $\phi$ is greater than $\nu$, this motion causes the sun elevation angle $\epsilon$ to oscillate between $\phi + \nu$ and $\phi - \nu$. Typically, it is desirable to keep the nutation angle $\nu$ below some limit and to keep the sun precession angle $\phi$ within some tolerance range of a particular angle. The limit, tolerance and angle vary during the lifetime of the satellite, depending on what the satellite is doing at the time.

Since two errors, namely, nutation error and sun angle error, are to be reduced, and available actions affect the quantities of both differently, an effective strategy must result in acceptable trade-offs between the two. Since, for unstable spinners, nutation may quickly grow beyond the capability of the actuators to control it, nutation should be given first priority if it is large.

Figure 5:
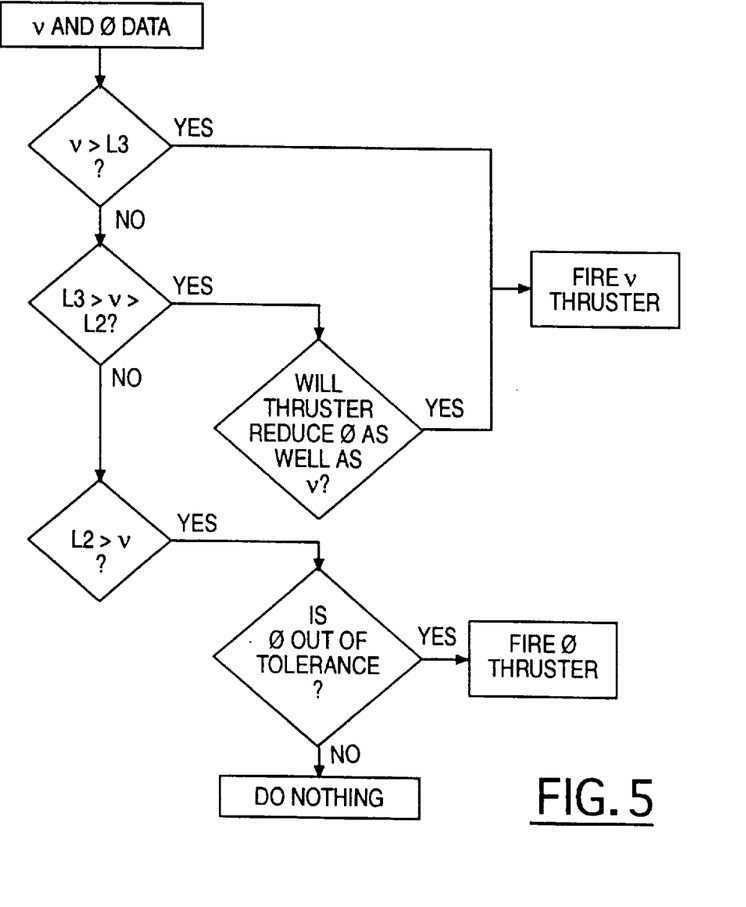
FIG. 5 is a flow diagram illustrating firing logic for controlling nutation and precession.

A sample strategy (FIG. 5) based on such a principle would assume that there is an amplitude (L3) of nutation angle $\nu$ beyond which both thrusters may have to be used to reduce nutation. If the nutation angle $\nu$ is this large, all efforts are bent toward reducing it; and the sun precession angle $\phi$ is temporarily ignored. Once nutation is reduced below L3, consideration is taken of both $\nu$ and $\phi$. In this situation, the thruster that reduces nutation is fired, but if and only if it reduces precession as well. If the amplitude of $\nu$ is below another level (L2), nutation is no longer a concern. Action need be taken then only if precession is outside an acceptable range.

It should be noted, and those skilled in the art of this invention will recognize, that practical applications of the invention will probably be more complex than that described in the somewhat idealized case described by the foregoing.

Sun sensors typically sense sun elevation, not nutation and precession angle. In a preferred embodiment of the present invention, a dual-slit, spinning sun sensor, such as one of those illustrated by FIG. 4A through 4D, is used to obtain a necessary precession reference, a spin phase reference and a nutation signal. The technology for measuring sun angle, nutation angle and phase is relatively well developed. (Refer, for example, to James R. Wertz, editor, *Spacecraft Attitude Determination and Control*, D. Reidel Publishing, 1978, section 7.1.1, section 16.3.2 and FIGS. 22.2 and 22.3.) The sun sensor uses a straight slit and a canted slit. To first order, "straight slit" time of arrival gives spin phase; and instantaneous sun elevation (the sum of precession and nutation) is computed from the elapsed time between the straight and canted slit times of arrival. The sun elevations are filtered to separate precession (bias) and nutation (oscillatory) signals.

The sun sensor signal is subject to corruption. The dynamics involved are not limited to rigid body dynamics. The sensor is subject to being misaligned in azimuth and elevation, the angle between its two null planes can be off-nominal, and there are many effects that can produce an apparent variation in sun angle when none, in fact, exists.

Sun sensor elevation bias, and bias caused by wobble induced by satellite dynamic imbalance, both result in a fixed error in the sensed sun elevation. This causes errors in the controlled precession angle on a one-to-one basis and can be accounted for if known through alignment surveys, gyro data and the like. Typically, these errors can be fairly tightly controlled, if necessary. A similar effect is caused by the forced coning effect induced by a body-fixed torque such as induced by the firing of a liquid apogee motor or by spinning up a momentum storage device with momentum perpendicular to the spin axis. In such cases, "before and after" sun precession angle measurements can be used to isolate these effects.

Sensor electronic noise, and vibrations due to structural or fluid oscillations, cause the sensed sun elevation to vary in the absence of nutation. Nutation can be isolated from these effects by filtering the signal to reduce the response to frequencies other than nutation. Lowering nutation feedback gain and using dead bands and/or other inhibit periods after firing also helps eliminate unnecessary thruster firings due to such effects.

Sensor or thruster azimuth misalignment, process delay or thruster lag produces a shift in sensed sun spin phase. As shown by FIG. 1, this causes a shift in $\psi$. This is of little concern in preventing solar yaw motion, but it is of somewhat more concern for satellite reorientations. Typically, such effects can be measured quite accurately on the ground. If necessary, these effects can be corrected or account can be taken of them.

In the simplest approach, the sun sensor is sampled once per spin period. The ratio of the spin frequency $\omega_s$ to nutation frequency $\lambda$ is denoted by $\sigma$, where $\sigma=\lambda/\omega_s$. Sun-sensor-based nutation control has been successfully simulated over a range of $\sigma=0.55$ through 0.95. When $\sigma$ approaches 0.5, 1 or 1.5, however, sampled-data effects cause trouble. As $\sigma$ approaches 1, the apparent nutation frequency $\eta$, which is $(\sigma-1)\omega_s$, viewed in the spinning frame by the sun sensor goes to zero and can no longer be distinguished from sun precession by the sun sensor.

Figure 3A:
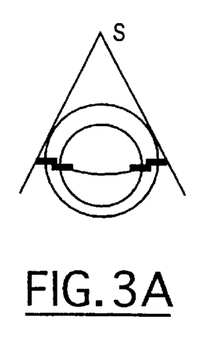
FIG. 3A illustrates nutation phase lock when two sensors are used and the ratio of nutation frequency to spin frequency is 1.

Nutation could be isolated by using multiple sun sensors, but at least three would be needed. Two would not suffice because of the phenomenon of nutation "phase lock," where nutation grows in amplitude at a phase that is midway between the phase of the two sun sensors. When this happens, the apparent sun elevation measured by the two sun sensors remains fixed despite the growth nutation. FIG. 3A illustrates how both sun sensors (indicated by "−") continue to see the same sun elevation as the nutation cone grows.

As $\sigma$ approaches 0.5 or 1.5, the apparent nutation frequency $\eta$ becomes half the sample frequency $\omega_s$ since $\eta=(\sigma-1)\omega_s$. This is known as a "Nyquist," or "folding," frequency. Experiments with $\sigma=0.5$ seem to indicate that the problem here is again a phase lock issue—the control system eliminates the nutation component it can observe, but the component that crosses through zero twice per cycle at the instant of the sun sensor measurement is unobservable and grows without being detected.

Figure 3B:
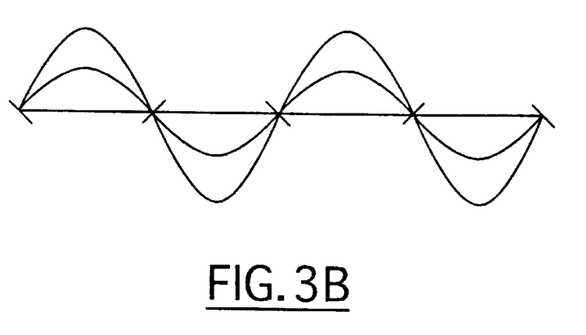
FIG. 3B illustrates nutation phase lock when one sensor is used and the ratio of nutation frequency to spin frequency is either 0.5 or 1.5.

FIG. 3B illustrates the sensed sun elevation as a function of time for two amplitudes. Actually, both FIGS. 3A and 3B essentially illustrate the same phenomena, the only difference being in the number of sensors used to obtain the measurements for each. Two sensors are used to obtain the two sun elevation measurements/cycle when $\sigma=1$ (FIG. 3A), and only one is used when $\sigma=0.5$ or 1.5 (FIG. 3B).

Figure 6:
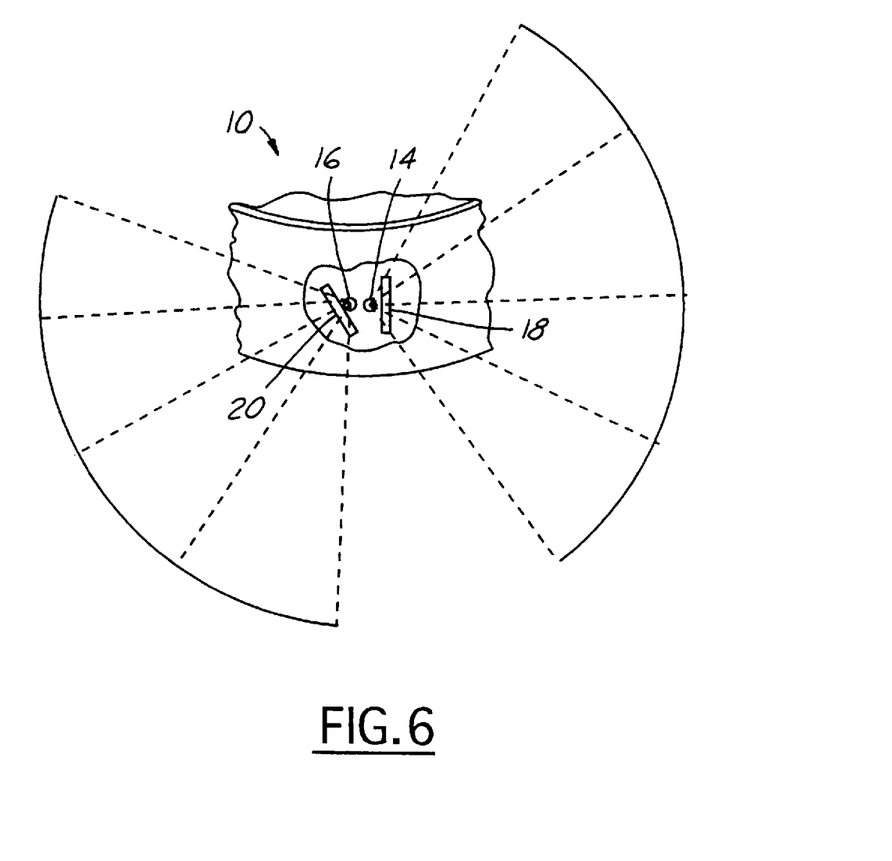
FIG. 6 is a fragmented view of a portion of the satellite, partly cut away to illustrate straight and canted elements of a dual-slit sun sensor.

Dual-slit, or "V" sun sensors are widely used by many spacecraft manufacturers. Such sensors consist of two (or more) solar cells, 14 and 16, each disposed behind a respective slit 18 and 20 that exposes it to a fan-shaped, and usually planar, field of view typically having a 90° arc. The solar cells produce a time of arrival pulse when the sun crosses a field of view, or "sensing fan." As previously mentioned, four such designs are depicted schematically by FIGS. 4A through 4D. The apparent motion of the sun relative to the four sensors illustrated by FIGS. 4A through 4D would appear to be from right to left. FIG. 6 illustrates the sensing fans associated with the sun sensor shown by FIG. 4A.

Figure 4A:
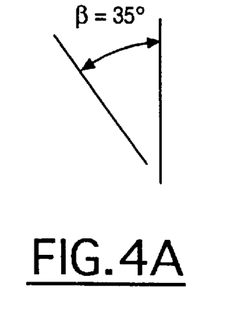
FIGS. 4A through 4D illustrate various dual-slit sun sensors.

Spin period is determined by the time between successive times of arrival for the vertical slit. Sun elevation is determined from the time between the times of arrival between the straight and the canted slits. As shown by FIG. 4A, the angle ($\beta$) between the straight and the canted slits is 35°. It should be understood that none of the illustrated designs exactly fits the simplistic model of the sun elevation being measured at a fixed spin phase.

In FIGS. 4A through 4D, the apparent motion of the sun is from right to left. Sun elevation cannot be calculated until the sun passes the leftmost slit, and the spin phase at which the sun crosses the leftmost slit varies with sun elevation for all illustrated designs except that shown by FIG. 4D. This effect can be accounted for in computing the appropriate delay from the time the sun elevation is computed to the time the thruster is fired. The design illustrated by FIG. 4D seems best suited for the sample strategy, previously described, that uses no time delays. The next best would be the X-slit design illustrated by FIG. 4C since the coupling of sun elevation into spin phase is only half that for the design illustrated by FIG. 4A.

Figure 4B:
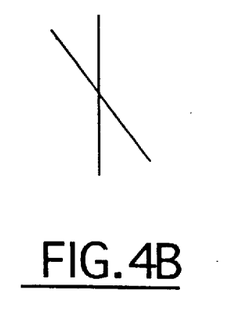
Figure 4C:
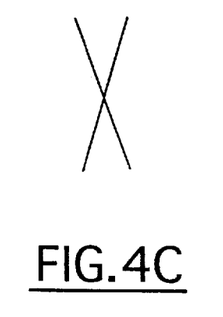
Figure 4D:
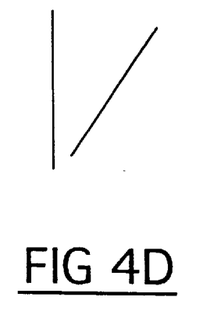

The sample strategy should also work fairly well, even with sensors shown by FIGS. 4A and 4B, however, since the variation in effective $\psi$ is $\nu\sin(\beta)\sin(\lambda t)$, and, once $\nu$ is small, this will be small as well. However, this effect does cause systematic attitude walk—the oscillatory behavior of the $\sin(\lambda t)$ is countered by the fact that the feedback torques are negative feedback for this term. So, for each $\Delta X$ firing, a sun azimuth precession of $\Delta H \nu \sin(\beta)$ develops. If the $\Delta H$ were sized to remove half the nutation per firing, it would result in an attitude walk of $\nu^2\sin(\beta)/2$ radians per pulse if this effect is neglected.

When $\nu$–0.035 radians (2°), this is 0.00035 radians (0.020°) per pulse. Fortunately, these numbers correspond to a spin speed of the sun sensor illustrated by FIG. 4B of 0.25 rpm, where the dedamping time constant will be hours, so there will be hours between pulses. The dedamping time constant shrinks as the spin speed increases, but the appropriate value of $\nu$ does also. Therefore, this should be even less a problem at higher spin speeds.

Another issue with simple processing of the sun slit information is that the sun elevation changes, due to nutation, between the times the sun crosses the two slits. The usual computation of sun elevation assumes that the sun elevation is fixed. A first-order approximation of the changing sun elevation is that the calculated sun elevation is the value for the sun elevation when the sun crosses the plane that is the mean of the planes of the two physical slits. For all but the X-slit design illustrated by FIG. 4C, this plane varies with sun elevation.

If the nutation control design is to use time delays in any event, the X-slit seems easier to handle: when the left slit is crossed, the calculated sun elevation is the value of the sun elevation at the time that is the average of the two times of arrival of the X-slits, and the calculated spin phase is the mean of the spin phases of the two slits. However, as with the effect mentioned in the previous paragraph, this effect seems quite tolerable and, in any case, becomes small once nutation is captured.

The simple model previously given for calculating the spin period and sun elevation from the sensors works best when the sun sensor is mounted so that its bore sight is 90° from the principal spin axis P and the sun is in the bore sight. As the sun line S approaches the spin axis P, the effect of nutation begins to show as a variation in the spin phase of the time of arrival of the straight slit; and the utility of the variation in sun elevation, as a measure of nutation decreases. Within the valid range of the sensors illustrated by FIGS. 4A through 4D, the sun elevation angle is still the best (single) source for measuring nutation; but a better estimate can be formed by processing both effects. In some cases, like an "extended range" UHF sun sensor (which has a 170° fan), this straight slit "kinematic coupling" effect could be the preferred source of nutation information.

The assumption that thruster firings in the basic design will always precess the angular momentum vector H in the same plane needs to be examined because the direction of the thruster torques is not referenced to H, but rather to the principal spin axis P. This is because the thrusters are conventionally fixed in the spacecraft body.

The intent of firing only at the instant of sun pulses, and using only thrusters that provide a momentum increment directly toward or away from the sun, is to always have the shift of the angular momentum toward or away from the sun so that there will be no precession except in the plane containing H and S. The idea is to avoid attitude walk in the orthogonal (unobservable) direction. Because the thruster firings are actually in the plane containing P and S, rather than H and S, the direction of the angular momentum shifts changes as P orbits H.

In many cases, the effect of this difference will be small. The size of this angular shift increases with nutation angle ν (the angle between P and H) and decreases with sun elevation ε (the angle between S and P). In many applications, an attempt will be made to keep the sun elevation near 90° (where this effect is zero) and the nutation angle ν small (which also helps).

If desired, however, an attempt could be made to eliminate this effect entirely by calculating the appropriate spin phase adjustment relative to the sun pulse that would correct for this effect and by keeping the plane containing H and ΔH constant for all the ΔH pulses. This adjustment would likely be implemented as a timing adjustment based on $\omega_s$.

In practice, the basic assumption that the thruster impulse is delivered at the instant of the sun pulse is modified by delays for activities such as detecting the sun pulse, determining the thruster command and opening the thruster firing valve. Further, the thruster impulse direction is determined by the centroid of the firing pulse rather than by an instantaneous event. As was mentioned previously, these effects shift the effective value of ψ. To the extent that these delays are fixed, the shift in ψ is constant. This condition does not lead to attitude walk, as illustrated by FIG. 1, but does shift the direction of precession, which is of concern if this technique is being used for a reorientation maneuver.

Additionally, some of these effects are variable. The computational lag may vary due to different logic paths used for different cases and due to the effects of higher-priority interrupts. The lag from firing command to pulse centroid varies with pulse size and also with things such as thruster temperature, propellant pressure and the interval since the last thruster firing. The net effect of a finite pulse on both nutation and precession should be carefully considered in light of the dynamics—for long pulses, the nonlinear effects are important. On a previous system, a control pulse was fired for one full spin period. The net effect was zero; but, because the body nutation period is much longer than a spin period, the effect on nutation is that of a short pulse.

All these effects can be mitigated by a combination of minimizing them in the design (especially the variations mentioned previously) and by compensating for them in adjusting the time of the firing command for their estimated effect. For this purpose, it is advantageous to manufacture the satellite such that the spin phase of the sun pulse precedes the spin phase at which the thruster pulses are initiated, in the cases of most concern, to avoid the impracticality of trying to initiate a thruster pulse prior to the triggering sun pulse.

Firing thrusters to damp nutation generally changes spin rate as well, the latter typically being decreased. If this effect is large, the momentum state may increase or decrease to an undesirable level.

The function of keeping the spin rate within an acceptable range can be incorporated quite simply since the sun sensor can easily measure spin speed—all that is needed is additional logic and appropriate spin thrusters. This can accomplish not only the function of maintaining a desired speed but also of implementing autonomous spinup/spindown maneuvers.

It might be desirable to control nutation without disturbing the orbit. Firing thrusters changes the satellite velocity as well as the momentum state. If symmetric radial thrusters, that is, thrusters whose line of action is essentially perpendicular to the spin axis, are being used to control nutation using this scheme, then in steady state there is no velocity buildup since thruster firings are alternated at two points approximately 180 degrees apart in spin phase. This simultaneously prevents precession accumulation and velocity accumulation.

It might be desirable to have a velocity increment (ΔV) in a particular direction. This may achieve desired orbit shifts that otherwise would require separate consumption of fuel. As a first approach, given that the satellite has many thrusters suitable for nutation control, as would be typical for a satellite that is body-stabilized on station, the thrusters assigned to the plus and minus torque roles can be selected to best meet this need. A second approach, suitable to radial ΔV changes, is to select the phasing of the firing plane ψ (FIG. 1) and use positive and negative torque firing pulses whose net velocity increment is known to be in the desired direction. In the simplest case, two radial thrusters, one above and one below the center of gravity of the spacecraft, would be used.

In implementing this system, the concept of a thruster pulse should not be restricted to a single continuous pulse from a single thruster at a single point in time. To achieve a desired effect, it may be best that the command to the actuator be a pulse pattern that may fire more than one thruster, and in a pattern spread out in time. Thruster patterns used in the past have included equal, simultaneous pulses from multiple thrusters. An example of this would be a spinning spacecraft having a pair of radial thrusters whose lines of action are parallel but pass on opposite sides of the spin axis. Firing either alone produces an undesired spinup/spindown torque, but firing equal, simultaneous pulses produce precession torque without spin torque.

Past patterns have also included simultaneous, unequal pulses from multiple thrusters. An example of this would be a satellite thruster control that, given a rate increment command, selects three thrusters and computes a different on-time for each so that the net effect is the necessary torque impulse.

Another past actuation strategy included multiple pulses from multiple thrusters. An example of this would be a strategy that fired two thrusters simultaneously for the same periods and then fired them again a half-spin period later. This produced zero net precession but an appreciable change in nutation angle since the body nutation period was much longer than a spin period. This is particularly suitable when using sun sensors (or earth/moon/star sensors) to sense nutation since spin period can be measured directly.

Thrusters are characteristically nonlinear devices, having minimum on-time, a nonlinear impulse-versus-on-time characteristic, pulse-to-pulse variation, and on-time granularity. There are, however, a number of techniques that can be used to mitigate these effects.

The minimum on-time poses a difficulty in controlling nutation to a level below the nutation increment ($\theta_{min}$) induced by a single minimum duration thruster pulse. Nutational motion can often be controlled well below $\theta_{min}$ with the use of thruster patterns that change the nutation by less than $\theta_{min}$. By combining pulses of various durations for different thrusters at different times, myriad effects can be achieved. For example, multiple thrusters can be fired simultaneously for the same on-time. Firing four parallel thrusters mounted at corners of a spacecraft face when the center of gravity of the satellite is slightly off center with respect to the center of the thruster pattern results in a nonzero net rate change.

Multiple thrusters can be fired for different on-times; for example, two of the mentioned four thrusters can be fired for 16 milliseconds and the other two fired for 12 milliseconds when the minimum on-time is 8 milliseconds and the center of gravity is near the center of the pattern. Multiple, timed pulses can also be fired. For example, two thruster pulses of magnitude L and opposing sign separated by a fraction f of a body nutation period has the effect of a single pulse of magnitude $2\sin(2\pi f)L$.

Another issue associated with minimum on-time is that the rate of nutation dedamping growth is often proportional to the nutation angle. It is therefore more fuel efficient to allow nutation to grow to $\theta_{min}$ or larger so that it can be reduced nearly to zero rather than to try to keep it down to a smaller value by firing at a lower threshold.

Similarly, it is useful to try to converge to operating to precession angles of $\phi$, $\phi+\theta_{min}$ and $\phi-\theta_{min}$. The reason for this is that, when the value for $\psi$ is to be changed, say, for a precession maneuver or so that thruster firings produce a desired velocity component, if the strategy changes are always made at the same precession angle ($\phi$), then the change in $\psi$ does not produce the nonplanar precession depicted by FIG. 1.

The impulse delivered by a thruster is nonlinear with on-time due to a number of effects. These include finite valve time, dribble volume effects, temperature and pressure. The thruster force typically climbs nearly to full value over a significant interval as the thruster valve opens, and the delay due to the distance between the thruster valve(s) and the injector depends on how much of the propellant in this dribble volume has evaporated since the last firing. Thrusters also tend to perform better as they warm during operation.

Implementing nutation control as a closed-loop feedback system greatly reduces the implications of this variation, and various means can be taken to reduce this variation. These include increasing the minimum commanded on-time to reduce the effects of thruster variation, using a fixed pulse width, and using predicted impulse-versus-on-time to adjust the commanded on-time to get the desired impulse.

As noted in the discussion of FIG. 1, if the spin phase separation of the thrust pattern used for the positive and negative pulses is uncertain, then this produces a systematic precession about the sun line. Solutions to this problem include careful surveying of the thruster alignment for determining the appropriate spin phase for thruster pulses; using the same thruster for both positive and negative pulses (using a spin delay of 0° or 180°); and using the "two equal pulses, half a spin phase apart, from a single thruster" pattern when precession is not desired. When using the latter solution, the timing may need to be adjusted for the effect of recent firing on the effective thruster delay.

Processing must be used to isolate the nutation and precession components from sun sensor pulse times, which are a function of precession, nutation and spin speed. The problem is complicated by the fact that the thruster firings generally alter all three of these quantities. Furthermore, most satellites pass through positions where they are eclipsed. The software should gracefully handle the disappearance and reappearance of the sun.

When an estimator is first enabled, or the sun reappears after an eclipse, there will not be enough solar data to determine the dynamic state, that is, nutation amplitude, nutation phase, sun elevation and spin speed. Also, after each thruster firing, these quantities will have changed.

A variety of approaches have been taken in an attempt to solve this problem. In one approach, the dynamic state is constructed by a finite impulse response (FIR) estimator that computes an answer based on the last three spin periods of data. Inherently, it needs only three spin periods of data after a restart or firing and is operated in this manner.

Another scheme uses an infinite impulse response (IIR) estimator and inhibits output for about 36 spin periods after initialization to allow settling. Because of this long start-up time, the sun nutation estimator is run all the time so that, when nutation control is enabled, actuation can be connected without delay if sun data has been usable for the necessary settling time.

A mixed approach could also be used where the FIR filter is used to bootstrap the IIR filter, or other data; for example, gyro data, could be used to start with a better initial estimate. A time-varying gain estimator, for example, a Kalman filter, approach could also be used to speed initialization of the IIR filter.

There are many variables in the nutation/precession control of even a simple rigid body with plus/minus torquing. The body dynamics have six degrees of freedom and depend on the triaxial inertia of the body and the torque vector components of the thrusters. Much can be done to simplify the problem by construction; but, even if the body is spin-symmetric and balanced, with 180° separated, pure transverse torquing thrusters, the ratio of nutation frequency to spin frequency ($\sigma$) is a critical parameter.

In architecting the nutation control, there is a trade-off between the complexity of the control algorithm and its region of usefulness. Most parameters can be hard coded in the design, estimated, or a combination of both. As an alternative, nutation amplitude is probably measured; nutation phase is determined explicitly or implicitly by filtered measurements; and spin rate is measured, implicitly determined by a discrete estimator, or assigned an assumed range using a band pass filter approach.

Sun elevation angles, which are not needed for simple nutation control but are needed for commanded precession, are measured. Sun azimuth is measured by sensor pulse and propagated by a timer if necessary. Rotation about the sun line is avoided by a choice of firing patterns. Nutation frequency is assigned an assumed range using a band-pass filter approach, spin rate is sensed, σ range is assumed, and frequency lock-on is adaptive. Thruster rate changes are assigned an assumed range using a gain margin approach, are assumed using feedforward, and are adaptively estimated.

General implementations with the capability of autonomous slews in directions other than in a single plane require the use of timers to be able to adjust the slew angle ψ. However, if all that is needed is to hold the sun angle and/or to slew autonomously in a single plane, usually directly toward or away from the sun, then timers are not required. All that is needed is a system that fires at the instant of the sun pulse, with a fixed duration, as in the basic example. This system uses a discrete, event-driven estimator that does calculations only when a sun pulse occurs. The next level of complexity would also include a simple firing delay timer. This allows full control without the need for a continuously running estimator. The continuous sun nutation rate estimator previously mentioned was not included because the sun thruster control needed it, but rather to support the use of a transverse wheel as a nutation control actuator.

The sample strategy can be made to reorient the satellite simply by commanding a new value for the sun precession angle ϕ. In general, an appropriate value for the slew angle ψ must also be commanded. As previously discussed, any change in ψ is best initiated when the system is close to the nominal value of the sun precession angle ϕ. For the system of the basic example, changing ψ requires the addition of a delay timer to delay the thruster pulses by the appropriate fraction of a spin period; and the estimator should also account for the affect that this delay has on the phasing of the thruster pulses with respect to nutation.

Precession is instituted by firing a thruster in an appropriate plane while suppressing any thruster pulses that would build up nutation so that nutation is limited and damped throughout the maneuver. At the end of the maneuver, ψ can be returned to its nominal value. This procedure becomes less accurate as the precession direction approaches a pure rotation about the sun line, that is, a maneuver that does not change the value of ϕ. Such maneuvers may, at some loss in fuel efficiency, be performed as a sequence of two or more maneuvers, each in a direction with a significant change in ϕ. Another approach would be to perform such maneuvers using an alternate reference, such as a spun earth sensor.

Adding logic to the previously described infinite impulse response estimator scheme to command a desired sun angle to suppress nutation damping pulses that would precess the satellite away from its desired orientation has been found to work quite well. The nutation control authority suffered somewhat in this case since half the nutation control firings were suppressed to prevent the introduction of the wrong sign of precession. The nutation continues to grow, albeit quite slowly, during the phase when the precession is being removed until the point at which the precession is approximately correct. Note that using, for example, only one jet for positive precession rather than four, and using small pulses, results in a lack of authority. Letting the estimator determine the effects of the firings on nutation and precession without telling it when or for how long they are firing also limits authority. More authority could be obtained by raising the gain and providing feedback information to the estimator.

The sample strategy is rather simplistic in determining how to assign weights to the precession and nutation errors used when calculating actuator commands. Other strategies could include using short pulses at the firing opportunities that reduce nutation yet worsen precession, and long pulses at the opportunities that aid both, the ratio being a function of how large each of the errors are. Another way to apportion authority between precession and nutation is to omit nutation control pulses on a pattern (for example, omit every other pulse that would help nutation but harm precession), on effectiveness (for example, omit nutation control pulses whose phasing with respect to reducing nutation is >X° from ideal and which harm precession) or on a probabilistic basis.

Pulse patterns, such as "two pulses 180° of spin phase apart," could be used when nutation is large but precession error is at the edge of what is tolerable. This pattern could also be used when the precession error is nearly zero to avoid perturbing it when it is at the desired value. Also, the same pattern with a slight differential between the two pulse widths, or with a spin phase separation different than 180°, could be used to nudge precession to the desired value when precession error is quite small.

While the best mode for carrying out the invention has been described in detail, those familiar with the art to which this invention relates will recognize various alternative designs and embodiments for practicing the invention as defined by the following claims.

What is claimed is:

1. A method for simultaneously controlling precession and nutation of a satellite capable of spinning about a spin axis and nutating about an angular momentum vector, the satellite including at least one thruster whose precession torques have a known spin phase with respect to at least one stationary reference relative to the satellite, the satellite also including a dual-slit sun sensor having a straight slit sensor and a canted slit sensor, the method comprising:

obtaining spinning measurements of the at least one reference by sensing solar times of arrival at the straight slit sensor and the canted slit sensor;

computing nutation and precessing angles from the spinning measurements by computing satellite spin phase from straight slit times of arrival, determining elapsed time between solar times of arrival at the straight and the canted slit sensors, computing instantaneous sun elevation from the elapsed time between solar times of arrival at the straight and the canted slit sensors, and determining satellite precession and nutation from the sun elevation; and firing the at least one thruster when positioned to limit nutation and precessing error to acceptable levels while driving them to desired states thereof.

2. The method as defined by claim 1, the step of computing instantaneous sun elevation including the substep of generating a sun elevation signal representative thereof.

3. The method as defined by claim 2, wherein the satellite precession and nutation are determined by filtering the sun elevation signal.

4. The method as defined by claim 3, wherein the step of sensing solar times of arrival at the straight slit sensor is preceded by the step of reorienting the satellite by commanding a new value for precession.

5. The method as defined by claim 4, the step of firing the at least one thruster including the substeps of:

establishing an upper reference amplitude of nutation angle;

establishing a lower reference amplitude of nutation angle, the upper amplitude being greater than the lower amplitude;

firing the at least one thruster to reduce nutation if the nutation angle is greater than the upper reference amplitude of nutation angle;

firing the at least one thruster to reduce nutation if and only if it also reduces precession if the nutation angle is between the upper and lower reference amplitudes of nutation angle; and firing the at least one thruster to improve precession if the nutation angle is below the lower reference amplitude of nutation angle and if precession is out of tolerance.

6. In a spin vector control for use in a satellite having a dual-slit sun sensor including a straight slit sensor and a canted slit sensor and spinning about a spin axis and nutating about an angular momentum vector, the satellite including at least one thruster whose precession torques have a known spin phase with respect to the sun, a method for simultaneously controlling precession and nutation of the satellite, the method comprising the steps of:

sensing solar times of arrival at the straight slit sensor;

sensing solar times of arrival at the canted slit sensor;

computing satellite spin phase from straight slit times of arrival;

determining elapsed time between solar times of arrival at the straight and the canted slit sensors;

computing instantaneous sun elevation from the elapsed time between solar times of arrival at the straight and the canted slit sensors and generating a sun elevation signal representative thereof;

determining satellite precession and nutation by filtering the sun elevation signal;

establishing an upper reference amplitude of nutation angle;

establishing a lower reference amplitude of nutation angle, the upper amplitude being greater than the lower amplitude;

firing the at least one thruster to reduce nutation if the nutation angle is greater than the upper reference amplitude of nutation angle;

firing the at least one thruster to reduce nutation if and only if it also reduces precession if the nutation angle is between the upper and lower reference amplitudes of nutation angles; and firing the at least one thruster to improve precession if the nutation angle is below the lower reference amplitude of nutation angle and if precession is out of tolerance.

7. The method as defined by claim 6, wherein the step of sensing solar times of arrival at the straight slit sensor is preceded by the step of reorienting the satellite by commanding a new value for precession.

* * * * *